(No Model.) 4 Sheets—Sheet 1.
O. SCHIESS.
AUTOMATIC VENDING MACHINE.
No. 372,175. Patented Oct. 25, 1887.
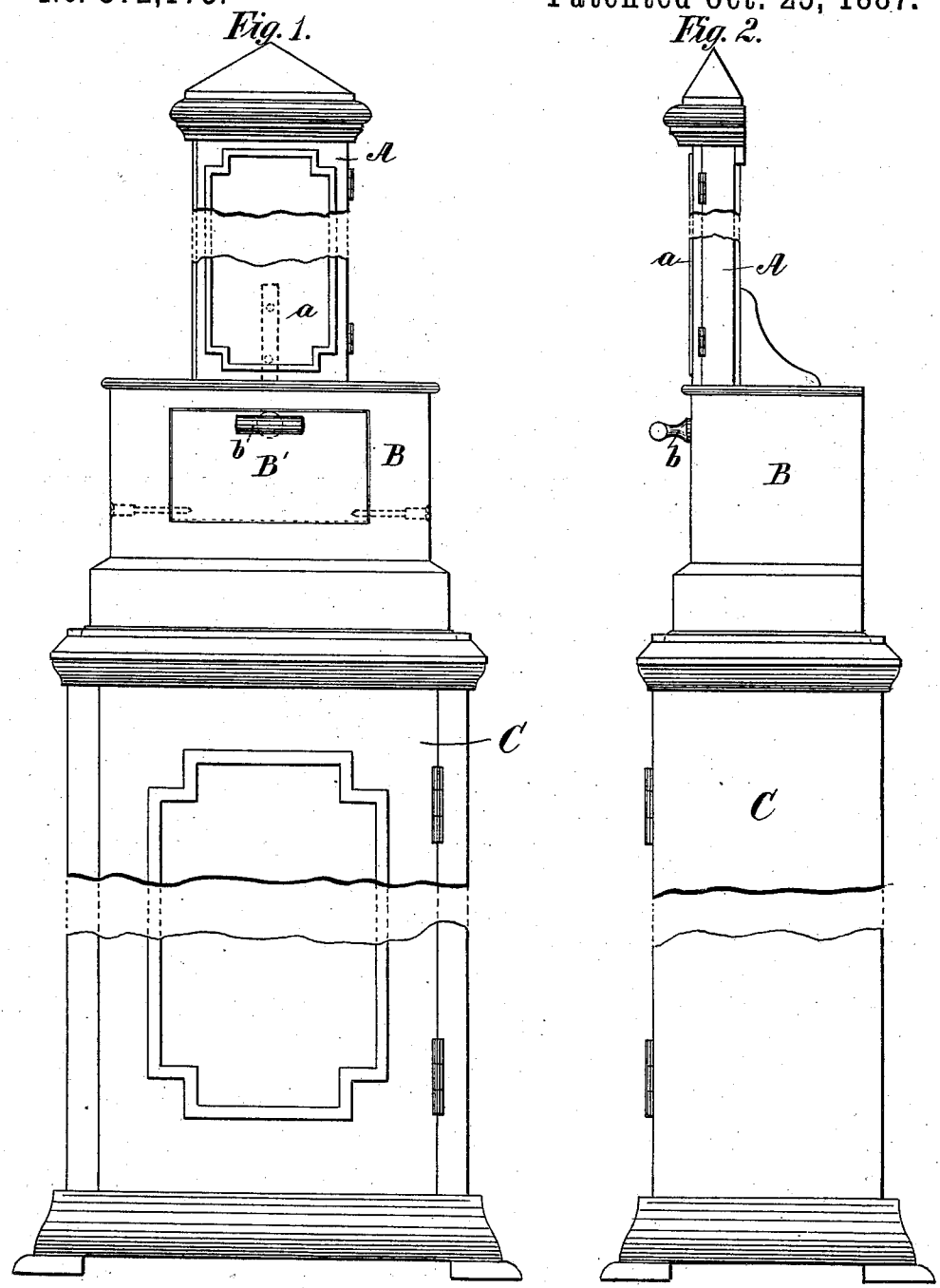
WITNESSES:
INVENTOR
Otto Schiess,
BY
ATTORNEY (No Model.) 4 Sheets—Sheet 2.
O. SCHIESS.
AUTOMATIC VENDING MACHINE.
No. 372,175. Patented Oct. 25, 1887.
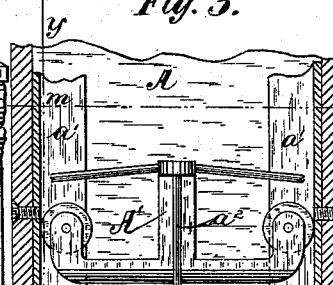
Fig. 24.
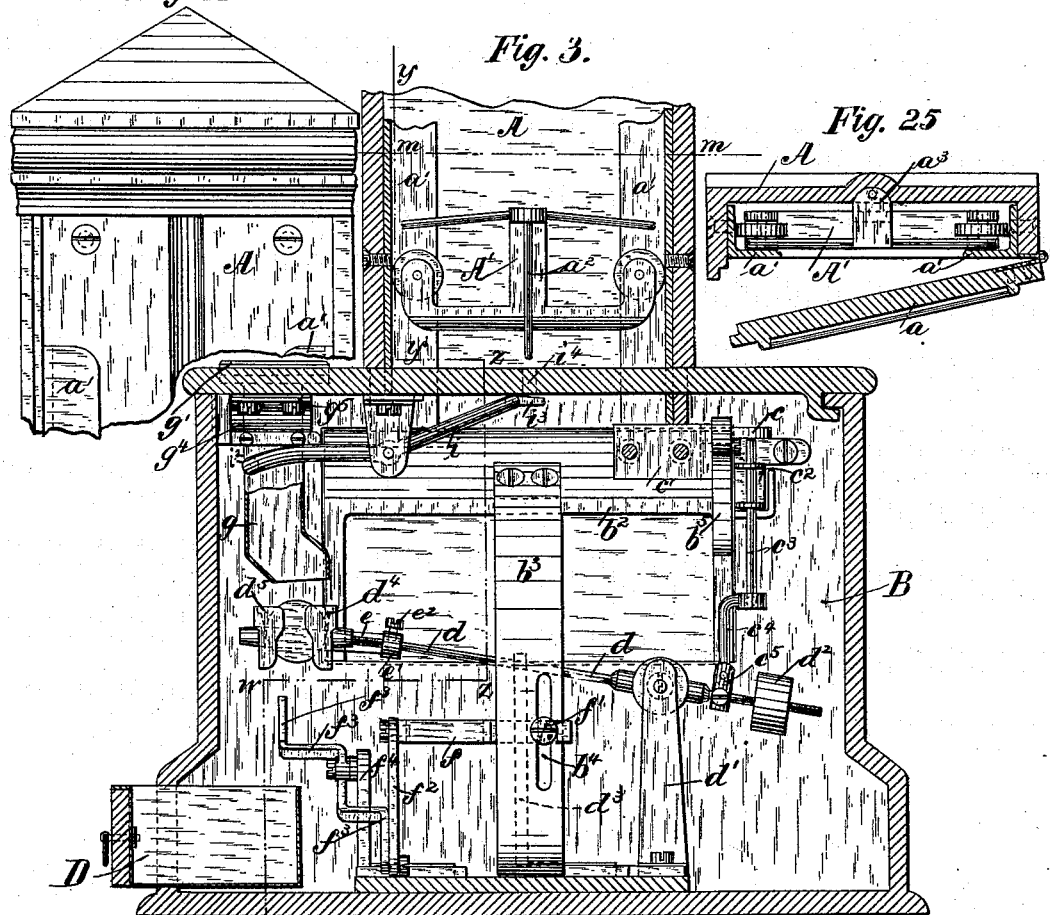
Fig. 3.
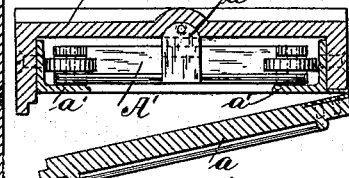
Fig. 25
Fig. 4.
WITNESSES:
Edw. F. Tourtellotte
William Bookstaver
INVENTOR
Otto Schiess,
BY
Hubert A. Banning
ATTORNEY

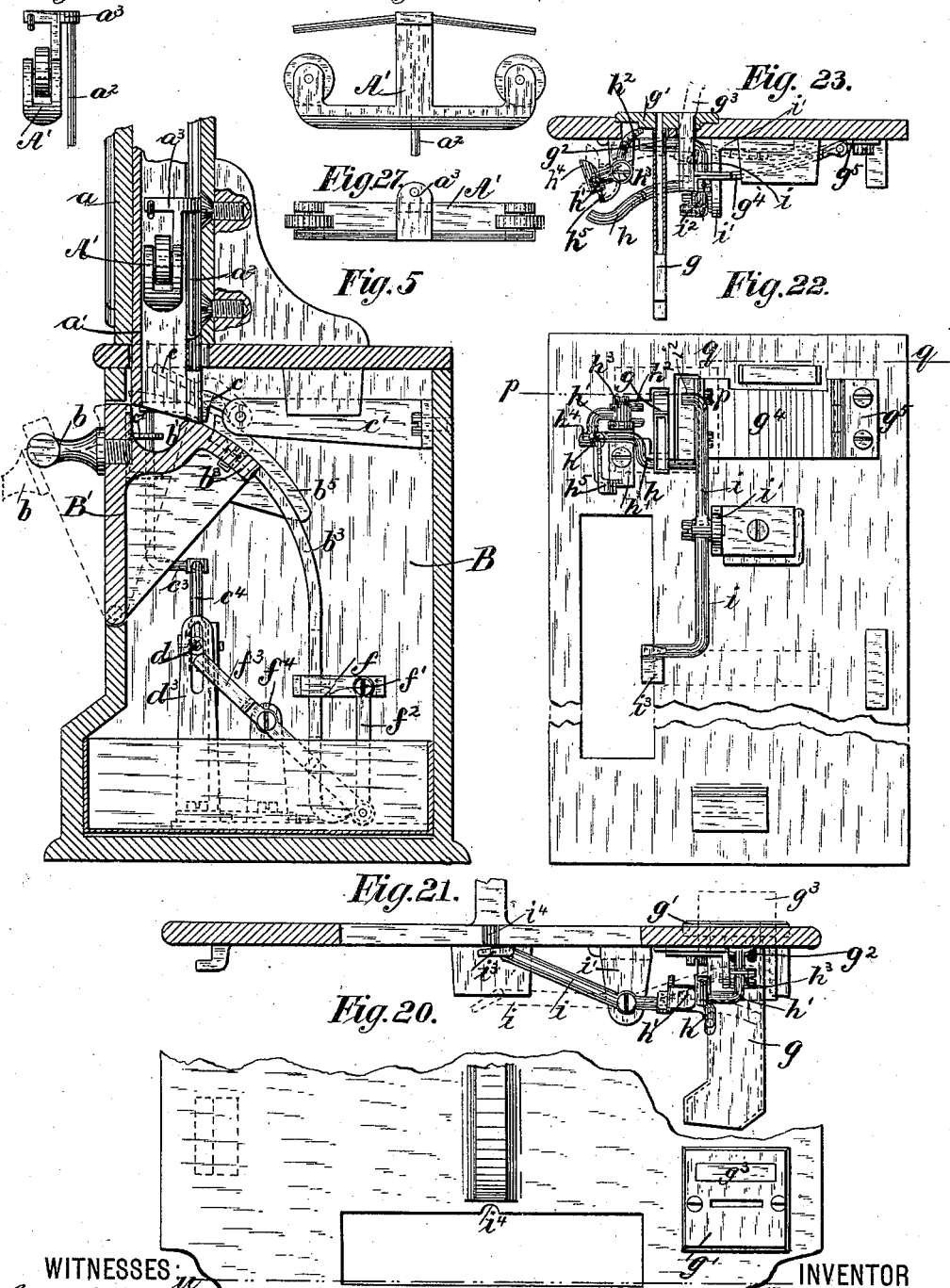

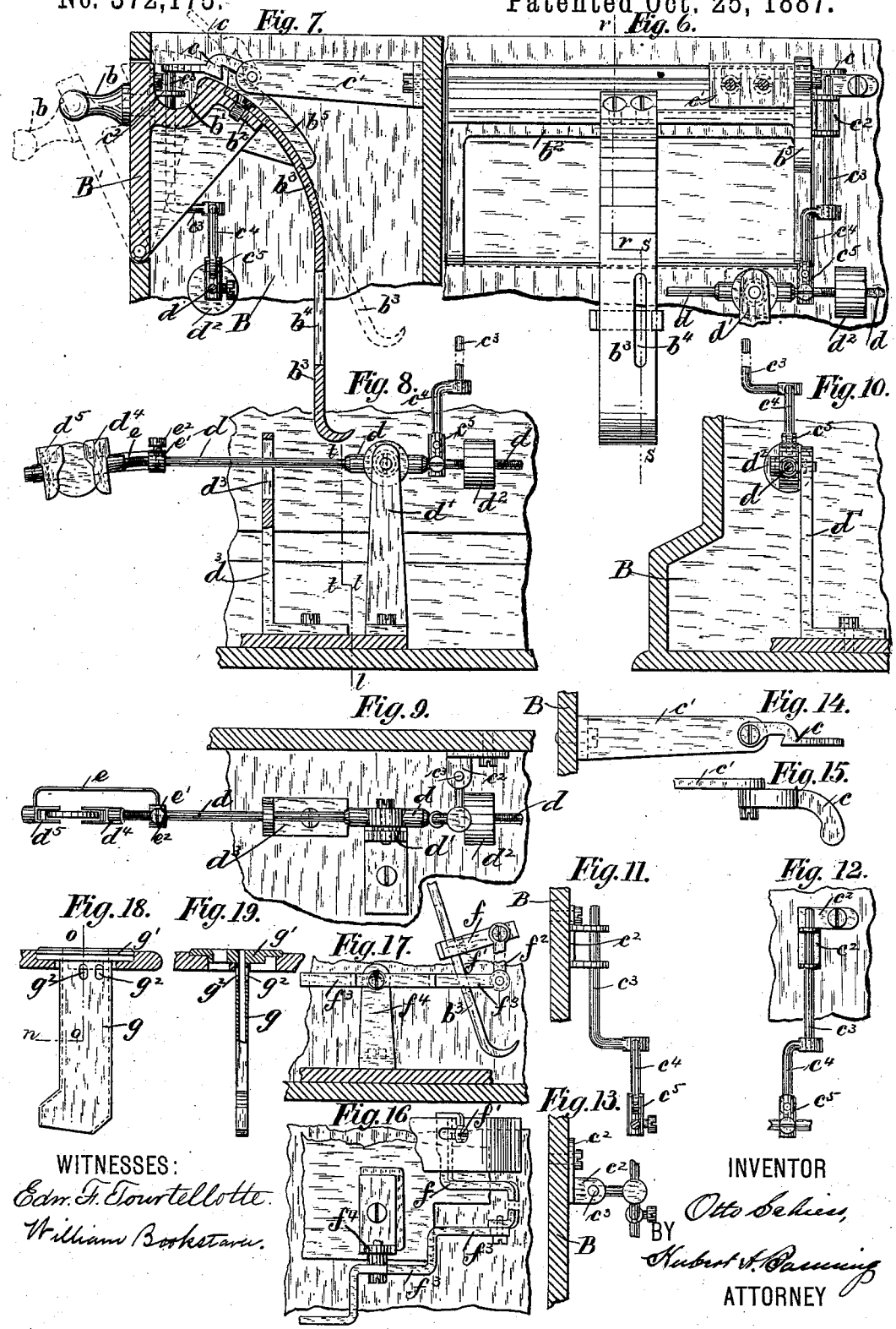

UNITED STATES PATENT OFFICE.

OTTO SCHIESS, OF NEW YORK, N. Y.

AUTOMATIC VENDING-MACHINE.

SPECIFICATION forming part of Letters Patent No. 372,175, dated October 25, 1887.

Application filed May 2, 1887. Serial No. 236,803. (No model.)

*To all whom it may concern:*

Be it known that I, OTTO SCHIESS, a citizen of Switzerland, and a resident of the city of New York, in the county and State of New York, have invented certain new and useful Improvements in Automatic Vending-Machines, of which the following is such a full, clear, concise, and exact description as will enable others skilled in the art to which my invention appertains to make and use the same, reference being had to the accompanying drawings, forming part of this specification.

The object of my invention is to construct a machine which will operate automatically to deliver the articles contained by it whenever the proper amount of money in coin is deposited within the same; and the machine shown by the illustrations of my invention is adapted to the sale of cigars, for which purpose its construction and operation will be more particularly described and pointed out.

Figure 1 is a front elevation of the machine, showing the general arrangement of the cigar-holding case A, delivering-box B, and stand C, as the same appear from the outside, the cigar-holding case A and stand C being broken so as to present the upper and lower ends. Fig. 2 is a side elevation of the same parts shown by Fig. 1. Fig. 3 is a section of the delivering-box B and of a portion of the cigar-case A, the section of the delivering-box being taken on the lines $x\,x$ of Fig. 4. This figure presents a rear elevation of the interior mechanism which operates to deliver the cigars from the case A, and shows also the money-receiving drawer D. Fig. 4 is a plan view of the delivering-box and its mechanism, excepting such as is attached to the cover, which is removed; and Fig. 5 is a cross-section of the delivering-box and of a portion of the cigar-case, the same being taken on the lines $y\,y$, $y\,z$, $z\,z$, $z\,w$, and $w\,w$ of Fig. 3. Fig. 6 is a rear view of a portion of the front of the delivering-box, showing such parts of the mechanism as are attached to or connected with such front; and Fig. 7 is a cross-section of a portion of the delivering-box, the same cutting the parts shown by Fig. 6 on the lines $r\,r$, $r\,s$, and $s\,s$ of Fig. 6. Fig. 8 is a rear view of the money-receiving jaws, showing a coin between the same, and showing in elevation the support for the lever which operates such jaws, and the manner in which such parts are attached and secured within the delivering-box; and Fig. 9 is a plan view of the same parts, but showing also the bracket attached to the front piece of the delivering-box, which receives the upwardly-projecting pin, shown broken in Fig. 8. Fig. 10 is a cross-section taken on the lines $t\,t\,t\,t$ of Fig. 8. Figs. 11, 12, and 13 are respectively a side elevation, a front elevation, and a plan view of the bracket on the front piece of the delivering-box, and, in connection therewith, of the pin which extends from the lever shown in Fig. 8 up to and passes through openings in the arms of such bracket. Fig. 14 is a side elevation of a pawl and a bracket attached to the back of the delivering-box, to which such pawl is connected, as shown also in Fig. 7. Fig. 15 is a plan view of such pawl and a portion of the bracket to which it is connected. Fig. 16 is a detail plan view of the mechanism which removes the money from the receiving-jaws and passes the same to the money-drawer, such mechanism being attached to an arm fastened upon the cigar-removing trough or drawer, as shown in Fig. 5. Fig. 17 is a side elevation of the parts shown by Fig. 16. Fig. 18 is a side elevation of the chute or slide attached to the cover of the delivering-box, and which guides the money to the receiving-jaws, and Fig. 19 is a front elevation thereof, a part being shown in section, as indicated by the lines $o\,o$ and $o\,n$ in Fig. 18. Fig. 20 is a top view of a portion of the cover of the delivering-box, showing the opening therein for receiving the cigars from the case A, and also the opening for receiving the money, and a top view of the exhaust-indicator. Fig. 21 is a longitudinal section on the line $u\,u$ of Fig. 20, showing by side elevation the mechanism attached to the under side of such cover, and showing also, by dotted lines, the position of the exhaust-indicator when the cigar-case is empty. Fig. 22 is a plan view of the cover of the delivering-box, looking from below, and showing the mechanism attached to or connected with such cover. Fig. 23 is a cross-section taken on the lines $p\,p$, $q\,q$ of Fig. 22. Fig. 24 is a front elevation of the upper portion of the cigar-case A. Fig. 25 is an end view of such cigar-case, looking into the lower end thereof when the door is partly open. Fig. 26 is a side elevation of a weighting device which works in a track, as indicated in Fig. 25. Fig. 27 is a view of such weight when looking from above, and Fig. 28 is an end view of the same part.

In the drawings similar reference-letters indicate like parts whenever repeated in the various figures.

The cigar-case A is preferably of a width sufficient to permit a cigar to lie across the same on the inside thereof. This case A is provided with a door, $a$, which, when open, permits of the placing of the cigars therein, one on top of another, until filled, and when closed it retains them until delivered by the operation of the machine; but, as the cigars pass by gravity, I provide a weighting device, $A'$, preferably balanced by arms projecting outwardly from a center post, more clearly shown by Fig. 26, such weighting device being, as there shown, provided with wheels which work in a way or track formed inside of the cigar-case by angle-irons $a'$ $a'$, one flange of which projects inwardly from the sides of the case; and, besides forming the track for the weight $A'$, these flanges or angle-irons also serve the purpose of keeping the cigars in place while the case is being filled. The weighting device $A'$ is also provided with a pin, $a^2$, secured at the back thereof to a lug, $a^3$, which lug moves in a groove along the back of the case A. This pin $a^2$ projects below the weight $A'$, such lower part moving in the groove back of the cigars, so that when the last cigar is taken from the case the pin $a^2$ passes through the cover of the delivering-case B, and by its connections sends an exhaust-indicator up through the cover of the delivering-case.

The delivering-case B is provided with a hinged door, $B'$, having a handle, $b$, and to the back of this door, or integral therewith, is a drawer or trough, $b'$, just large enough to hold one cigar and to permit of the removal of the same before the next one is allowed to pass from the case above it. The back of the trough $b'$ is slightly rounded at the top, and has a flange, $b^2$, which, when the door is opened to remove a cigar, acts as a follower and prevents the cigar next above from dropping down until the door is again closed. To the central portion of the flange $b^2$ is secured an arm, $b^3$, which arm extends to the bottom of the delivering-box and terminates within a curve or hook at the end. About one-third the distance from the lower end of this arm it is provided with a longitudinal slot, $b^4$.

At one end of the flange $b^2$, which projects from the delivering-trough, there is a ratchet formed at the end of an upwardly-projecting step, $b^5$, the portion forming which extends back a distance beyond the flange from which it is raised, thus forming a track or slide. Directly over the track formed by the step $b^5$ is located a winged pawl, $c$, (shown in detail by Figs. 14 and 15,) which is pivoted to the arm $c'$ of a bracket secured to the back of the delivering-box. This pawl operates in the ratchet of the step $b^5$, and prevents the door of the delivering-box from being opened until the pawl $c$ has been lifted out of the ratchet. To the front of the delivering-box, just beyond the end of the trough having such ratchet-and-pawl connection, is secured a small bracket, $c^2$, which preferably has two arms through which are openings, the purpose being to provide a guide for a pin, $c^3$, the end of which comes directly beneath the wing of the pawl $c$. The pin $c^3$ has an elbow which leads it to an arm, $c^4$, to which the pin $c^3$ is secured. The arm $c^4$ also has an elbow at or near right angles to the pin $c^3$, and such arm extends downwardly and is jointed to a small arm, $c^5$, which is secured upon one arm of a lever, $d$. The lever $d$ is fulcrumed to a bracket, $d'$, secured to the bottom of the delivering-box, and one arm of the lever $d$ is weighted by an adjustable weight, $d^2$, which, as shown, is made adjustable by being screwed upon threads on the end of one of the arms of the lever $d$, such weight being made, when free to act, to hold down the end of the lever to which it is secured, thereby depressing the small arm $c^5$, arm $c^4$, and pin $c^3$, so that when such parts are depressed by the weight upon such lever the pawl $c$ rests either in the ratchet of the step $b^5$ or on the track formed by such, according to whether the door is opened or closed, thus permitting the door to open or the pawl to lock the door of the delivering-box, as the case may be.

The arm of the lever $d$ opposite to that upon which the weight $d^2$ is secured projects through a slot in a bracket, $d^3$, most clearly shown in Fig. 5, such arm being provided at its outer end with a jaw, $d^4$, which, in connection with another jaw, $d^5$, receives the coin. These jaws may be made of sheet metal and of sufficient width to catch the coin. The jaw $d^5$ is attached to a flat spring, $e$, which is secured at its opposite end to a button, $e'$, made to slide upon the arm of the lever $d$, and to be secured and fixed at any desired point by a set-screw, $e^2$, thus permitting the regulation of the distance between the jaws $d^4$ and $d^5$. The jaws $d^4$ and $d^5$ are so set that the opening between the same is greater at the top than at the bottom, so that when a coin is received by them it will be retained until removed therefrom. The weight of the coin tips the lever, and consequently the pin $c^3$, by reason of its connections, is thrust upwardly against the wing of the pawl $c$ and lifts the pawl from its corresponding ratchet, thus unlocking the door of the delivery-box and permitting the opening of the door by pulling the handle $b$, and this withdraws a cigar in the trough $b'$ from the case, so that it can be picked up and the door closed and again locked by the dropping of the pawl.

An angle arm or bracket, $f$, is attached to the arm $b^3$ by a set-screw, $f'$, which passes through the slot $b^4$, and this angle-bracket forms, by reason of its bends, a kind of crank, which is connected at its outer extremity with a link, $f^2$, the opposite end of which free lever is jointed to one arm of a lever, $f^3$. (Shown in the form of a step-lever having one free arm.) This step-lever $f^3$ is fulcrumed upon a bracket or post, $f^4$, which is secured to the bottom plate of the delivering-box. The free arm of the lever $f^3$ extends to a point which brings it, when operating, between the coin-receiving jaws $d^4$ and $d^5$; but when not operating this arm of the lever $f^3$ does not extend quite far enough to come between such coin-receiving jaws, but permits them to move freely if weighted with a coin. The adjustment is such that when a coin is dropped into the delivering-box and caught by the jaws $d^4$ and $d^5$ it tips the lever $d$, so that the jaws, by the weight of the coin, pass downward and bring and retain the coin just below the point or outer extremity of the free arm of the lever $f^3$, in which position such jaws, with the coin, remain until the door B is opened. The opening of the door draws the arm $b^3$ forward, which tips its lower extremity upward, and such movement causes the crank or bracket arm $f$ (which, as before stated, is secured to the arm $b^3$) to describe an arc, and by such movement the link $f^2$ is drawn upward, and with it the step lever $f^3$ is tilted, causing the outer extremity of its free arm to strike the top of the coin and knock the same down from between the jaws $d^4$ and $d^5$ into the money-drawer D. When the coin passes from between the jaws $d^4$ and $d^5$, the weight $d^2$ on the other arm of the lever $d$ drops down, tilts the jaws up, and removes the pin $c^3$ from contact with the wing of the pawl $c$, which pawl then rests upon the track or way formed by the step $b^5$, so that when the door is again closed the pawl will drop over the ratchet of such step and lock the door until another coin passes into the jaws.

In order to conduct the coin to the jaws $d^4$ and $d^5$, I provide a chute, $g$, the form of which appears by Figs. 18 and 19, and this chute is preferably turned slightly to one side at its lower extremity, which prevents too sudden a dropping of the coin into the jaws and lets the same in lightly after the force of gravitation has been interrupted. This slight bend in the chute permits also of a little shortening of the arm of the lever $d$, to which the coin-receiving jaws are connected, and consequently allows a better adjustment of the mechanism. The chute $g$ is attached to a plate, $g'$, which is secured to the outside of the cover of the delivering-box, such plate having an opening leading into the chute for the deposit of a coin. The chute $g$, just beneath the cover of the delivering-box, has two small slots, $g^2$ $g^2$, which pass through both sides thereof, such slots being intended for the reception of pins to prevent the deposit of coin when the supply of cigars is exhausted.

The plate $g'$ has an opening within which a thrust or exhaust indicator, $g^3$, fits, and out from which such exhaust-indicator is projected when the last cigar is taken from the box, while at the same time the chute $g$ is closed in such manner as to prevent any further deposit of coin until the machine has been replenished. The exhaust-indicator $g^3$ projects below the cover of the delivering-box, and is there connected to an arm-hinge, $g^4$, which is secured and hinged to a plate, $g^5$, on the under side of the cover of the delivering-box, as shown by Figs. 22 and 23. Attached to this arm-hinge $g^4$ is also a tongue, $h$, which projects past the exhaust-indicator $g^3$ and past one side of the chute $g$, so as to connect with a tilting-lever, $h'$, having at one end a fork, $h^2$, the prongs of which are adapted to pass through the slots $g^2$ $g^2$ of the chute whenever such lever is tilted by the action of the tongue $h$ thereon.

The form of the tilting-lever $h'$ is best shown in Fig. 22, which shows a bottom plan of the same in connection with the parts with which it acts. This tilting-lever is hinged or fulcrumed at $h^3$ to a small bracket-post secured to the bottom of the cover, and the fork $h^2$ forms one arm, while on the opposite side of the fulcrum $h^3$ the other arm, after forming an elbow, is provided with a stud or resting-post, $h^4$, against one end of which the tongue $h$ strikes. A further extension, $h^5$, projects outwardly from the resting-post $h^4$, forming a kind of weight or balance for this tilting-lever, so that when the machine is filled with cigars it will be sure to tip far enough downward to withdraw the prongs of the fork $h^2$ from the slots $g^2$ $g^2$ in the chute $g$. Another lever, $i$, extending practically at right angles to the hinge-arm $g^4$, is secured to a downwardly-projecting post $i'$ of a bracket fastened to the under side of the cover of the delivering-box. This lever $i$ has one arm terminating in a tongue, $i^2$, which rests beneath and across the lower end of the exhaust-indicator $g^3$, while the opposite arm of this lever, after forming an elbow, terminates in a wing, $i^3$.

Directly above the wing $i^3$ of the lever $i$ is a semicircular extension of the opening in the cover of the delivering-box, through which the cigars drop from the case A into the trough of the door of such box, and such semicircular opening $i^4$ comes beneath the line of travel of the pin $a^2$, carried by the weight A′, so that when the last cigar has dropped from the case A into the trough of the delivering-box the pin $a^2$ passes on through the opening $i^4$ and strikes the wing $i^3$ of the lever $i$, thus tilting such lever and causing its tongue $i^2$ to press the exhaust indicator $g^3$ up out of the plate $g'$ and at the same time causing the tongue $h$, carried by the hinge-arm $g^4$, to press upon the resting-post $h^4$ of the lever $h'$, thus tilting such lever and causing the prongs of the fork $h^2$ to pass into the slots $g^2$ $g^2$ of the chute $g$, which operation not only indicates that the cigars are exhausted, but also prevents the depositing of any more money in the box by the closing of the chute.

The machine being in order and the case A filled with cigars, the lowest cigar will rest in the trough $b'$, while at the same time the door of the delivering-case B is locked by the pawl c, which in such case rests in the ratchet formed by the step b. A person desiring to obtain a cigar will drop a coin of the proper denomination through the opening in the plate g' of the cover of the delivering-box. This coin passes down the chute g, is caught between the jaws $d^4$ and $d^5$, and its weight tips the lever d, so that the pin $c^3$ rises and strikes the wing of the pawl c, lifts the pawl far enough up to clear the ratchet, which permits the door of the delivering-box to be opened and a cigar carried out in the trough b'. When, however, the door is being opened, its movement carries the arm $b^3$ upward, and this arm, being connected with the lever f, carries the same along with it and moves the link $f^2$, which tilts the step-lever $f^3$, causing the outer extremity of its free arm to pass downward and strike the coin which has been held between the jaws, thus knocking the same from between such jaws into the money-drawer below. When this is done, the weight $d^2$ tips the jaws up again and lowers the pin $c^3$, so that when the door is closed again the pawl c will drop into the ratchet of the step $b^5$, thus locking the door as soon as closed, and when closed another cigar will drop into the trough b', ready to be removed by a similar operation.

Having thus described my invention, what I claim as new, and desire to secure by Letters Patent, is—

1. In a vending-machine having a door, the combination therewith of a ratchet, a pawl adapted to enter said ratchet, said pawl being provided with a wing whereby it may be lifted, a pin adapted to move against said wing, a lever with one of the arms of which said pin has connection, the other arm of said lever being provided with jaws adapted to receive a coin, the weight of which will operate said lever, and to retain such coin until said lever is operated, said pin raised, said pawl lifted from said ratchet, and said door opened sufficiently to cause said pawl to escape said ratchet, substantially as described.

2. In a vending-machine, the combination, with the door of the delivering-box thereof, of a receptacle for holding the article to be delivered, said receptacle having at one end a step or track forming a ratchet, a winged pawl adapted to slide upon said track and to enter said ratchet, a pin located beneath the wing of said pawl, a lever, with one arm of which said pin has connection, a fixed jaw on the opposite arm of said lever, a second jaw, and a spring to one end of which said second jaw is connected, said spring being made to extend past said first-mentioned jaw and having its other end adjustably secured to said arm, whereby the space between said jaws may be regulated to receive and retain a coin, the weight of which operates said lever, thereby moving said pin and lifting said pawl, substantially as described.

3. In a vending-machine, the combination of a door adapted to be locked by a ratchet and pawl, a pin adapted to lift said pawl from said ratchet, a lever, with one arm of which said pin has connection, and jaws secured to the opposite arm of said lever, said jaws being adapted to receive and retain a coin the weight of which will tip said lever, whereby said pin is raised, said pawl lifted, and the door unlocked, substantially as described.

4. In a vending-machine, the combination of a door having a ratchet, with a pawl adapted to enter said ratchet, a pin adapted to lift said pawl, a lever, with one arm of which said pin has connection, an adjustable weight on the same arm of said lever, and jaws on the opposite arm of said lever, said jaws being adapted to receive a coin the heft of which will overcome that of said weight, whereby said lever may be tipped, said pin raised, said pawl lifted, and said door unlocked, substantially as described.

5. In a vending-machine, the combination of a door adapted to be locked by a ratchet and a pawl, a pin adapted to lift said pawl, a lever, with one arm of which said pin has connection, the opposite arm of said lever being made to carry jaws adapted to receive a coin, by the weight of which said lever is operated, the said door being provided with an arm adapted to move therewith, and lever-connections with said arm, such connections being made to extend sufficiently far to reach between said jaws, whereby the opening of said door actuates said connections, thereby removing said coin from said jaws and permitting said pin to move from said pawl, substantially as and for the purpose set forth.

6. In a vending-machine, the combination of a door, B', trough b', step $b^5$, said step forming a track and ratchet, winged pawl c, adapted to slide upon said track and enter said ratchet, bracket c', to which said pawl is secured, bracket $c^2$, pin $c^3$, made to extend through the arms of said bracket $c^2$, which form a guide therefor, said pin being adapted to move against the wing of said pawl, and lever d, with one arm of which said pin has connection, the other arm of said lever being provided with jaws adapted to receive a coin, by the weight of which said lever is operated, said pin raised, said pawl lifted from said ratchet, whereby said door is unlocked, substantially as described.

7. In a vending-machine, the combination of a door, B', trough b', step $b^5$, said step forming a track and ratchet, winged pawl c, adapted to slide upon said track and enter said ratchet, pin $c^3$, adapted to move against the wing of said pawl, arm $c^4$, connected with said pin, lever d, small arm $c^5$, connected with said arm $c^4$, and also with one arm of said lever, the other arm of said lever being provided with jaws adapted to receive a coin by the weight of which said lever is operated, said pin raised, said pawl lifted from said ratchet, whereby said door is unlocked, substantially as described.

8. In a vending-machine, the combination of a door, B', trough b', step $b^5$, said step forming a track and ratchet, winged pawl $c$, adapted to slide upon said track and to enter said ratchet, pin $c^3$, adapted to move against the wing of said pawl, arm $c^4$, connected with said pin, lever $d$, arm $c^5$, connected with said arm $c^4$, and also with one arm of said lever, weight $d^2$ on the same arm of said lever, bracket $d'$, to which said lever is fulcrumed, and jaws $d^4\ d^5$ on the arm of said lever opposite said weight, said jaws being adapted to receive a coin, the heft of which overcomes that of said weight, thereby operating said lever, lifting said pin, and raising said pawl from said ratchet, whereby said door is unlocked, substantially as described.

9. In a vending-machine, the combination of a door adapted to be locked by a ratchet and pawl, a pin adapted to lift said pawl, a lever, with one arm of which said pin has connection, the opposite arm of said lever being made to carry jaws adapted to receive a coin, by the weight of which said lever is operated, the said door being provided with an arm adapted to move therewith, a crank connected with said arm, a link connected at one end with said crank, and a fulcrumed lever connected with the other end of said link, said fulcrumed lever having one free arm adapted to pass between said jaws, whereby the opening of said door causes the coin to be removed from said jaws, substantially as and for the purpose set forth.

10. In a vending-machine having a door and means for receiving a coin, the weight of which operates mechanism for unlocking said door, the combination, with such door, of an arm adapted to move therewith, a crank connected with said arm, a link connected at one end with said crank, and a fulcrumed lever connected to the other end of said link, said last-mentioned lever being adapted to detach said coin from the mechanism operated by it, whereby the opening of said door actuates said arm, its crank and lever connections, thereby detaching the coin from connection with the locking mechanism, whereby such mechanism is permitted to lock said door when again closed, substantially as described.

11. In a vending-machine, a case adapted to hold the articles to be sold, said case being provided with a weight having a pin, said weight being adapted to move above and said pin behind the said articles in said case, in combination with a delivering-box having a cover provided with an exhaust-indicator, and a lever on the under side of said cover connecting with and adapted to operate said indicator, the said lever being provided at its opposite end with a wing located beneath an opening in said cover on the line of travel of the said pin on the said weight, whereby when the said machine is empty said pin on said weight operates said winged lever and said exhaust-indicator, substantially as described.

12. In a vending-machine, a case adapted to hold the articles to be sold, said case being provided with a weight having a pin projecting behind and below the same, in combination with a delivering-box having a door, and mechanism adapted to be operated by a coin, whereby said door is unlocked, a chute adapted to receive the coin, said chute being provided with slots near its outer end, a lever having prongs adapted to enter said slots, an exhaust-indicator, a hinge-arm, to which said indicator is secured, said arm being provided with a tongue adapted to operate said pronged lever, and another lever adapted to operate said exhaust-indicator, said last-named lever being provided with a wing located beneath an opening in the cover of said delivering-box on the line of travel of said pin on said weight, whereby when said receiving-case is empty said exhaust-indicator is operated and said chute closed, substantially as described.

OTTO SCHIESS.

Witnesses:
HUBERT A. BANNING,
WILLIAM BOOKSTAREE.